(12) United States Patent
Stollberg et al.

(10) Patent No.: US 8,815,978 B2
(45) Date of Patent: Aug. 26, 2014

(54) PROCESS FOR MODIFYING NATURAL RUBBER, AND MODIFIED NATURAL RUBBER

(75) Inventors: Sandra Stollberg, Auhagen (DE); Hajo Weinreich, Apelern (DE)

(73) Assignee: Continental Reifen Deutschland GmbH, Hannover (DE)

( * ) Notice: Subject to any disclaimer, the term of this patent is extended or adjusted under 35 U.S.C. 154(b) by 74 days.

(21) Appl. No.: 12/929,788

(22) Filed: Feb. 16, 2011

(65) Prior Publication Data
US 2011/0144233 A1 Jun. 16, 2011

Related U.S. Application Data

(63) Continuation of application No. PCT/EP2009/057500, filed on Jun. 17, 2009.

(30) Foreign Application Priority Data

Aug. 16, 2008 (DE) .......................... 10 2008 038 000

(51) Int. Cl.
C08J 3/12 (2006.01)
C08C 3/02 (2006.01)
C08L 7/00 (2006.01)
C08C 3/00 (2006.01)
C08C 1/15 (2006.01)

(52) U.S. Cl.
CPC ... C08C 3/00 (2013.01); C08C 3/02 (2013.01); C08J 2307/00 (2013.01); C08L 7/00 (2013.01); C08C 1/15 (2013.01); C08J 3/12 (2013.01)
USPC ...................................... 523/155; 524/575.5

(58) Field of Classification Search
CPC ................. C08C 1/15; C08C 3/02; C08L 7/00
USPC ........................................................ 523/155
See application file for complete search history.

(56) References Cited

U.S. PATENT DOCUMENTS

| | | | | |
|---|---|---|---|---|
| 4,025,990 A | * | 5/1977 | Lovette, Jr, | 241/14 |
| 4,638,028 A | * | 1/1987 | Lui et al. | 524/387 |
| 5,585,459 A | * | 12/1996 | Tanaka et al. | 528/486 |
| 6,045,070 A | * | 4/2000 | Davenport | 241/60 |
| 6,410,606 B2 | | 6/2002 | Banba et al. | |
| 2004/0162382 A1 | * | 8/2004 | Steiner et al. | 524/492 |
| 2005/0119452 A1 | * | 6/2005 | Yamaguchi et al. | 528/480 |
| 2006/0074135 A1 | * | 4/2006 | Shahidi et al. | 521/41 |
| 2007/0010610 A1 | * | 1/2007 | Kondo | 524/493 |
| 2010/0222488 A1 | * | 9/2010 | Kondo | 524/495 |

FOREIGN PATENT DOCUMENTS

| | | |
|---|---|---|
| DE | 199 13 047 | 4/2004 |
| EP | 0 950 485 | 10/1999 |
| GB | 741049 | 11/1955 |
| GB | 971390 | 9/1964 |
| GB | 1 392 287 | 4/1975 |
| JP | 2006-176593 | * 7/2006 |
| WO | WO 2007/088771 | * 8/2007 |

OTHER PUBLICATIONS

Derwent absract of JP 2006-176593.*
Harmon et al, Degradation of Natural Rubber during Mill Mastication, J. of Applied Polymer Science, vol. 10, pp. 253-257 (1966).*
Machine translation of JP 2006-176593.*

* cited by examiner

*Primary Examiner* — Doris Lee
(74) *Attorney, Agent, or Firm* — Walter Ottesen P.A.

(57) ABSTRACT

A process for modifying natural rubber and modified natural rubber with improved processing performance. The process for modifying natural rubber includes at least the following process steps: comminuting the natural rubber in a first process step; blending and purifying the natural rubber in a second process step; further comminuting the natural rubber in a third process step; and, drying the natural rubber in a fourth process step. The modified natural rubber is modified by at least four process steps.

30 Claims, No Drawings

US 8,815,978 B2

PROCESS FOR MODIFYING NATURAL RUBBER, AND MODIFIED NATURAL RUBBER

CROSS REFERENCE TO RELATED APPLICATIONS

This application is a continuation application of international patent application PCT/EP 2009/057500, filed Jun. 17, 2009, designating the United States and claiming priority from German application 10 2008 038 000.8, filed Aug. 16, 2008, and the entire content of both applications is incorporated herein by reference.

FIELD OF THE INVENTION

The invention relates to a process for modifying natural rubber and to modified natural rubber with improved processing performance.

BACKGROUND OF THE INVENTION

Natural rubber (NR) is obtained from the white latex (latex milk) of particular plants encountered in the tropical climate zone. This latex milk is coagulated to obtain commercially available natural rubber, which finds various uses in large amounts in the rubber-processing industry. For example, in 2005, 8 703 000 t of natural rubber were produced and 8 777 000 t of natural rubber were consumed, of which approximately 70% of the consumption is in the automotive tire sector [source: Römpp, Chemielexikon online, Version 3.1].

The physical and chemical properties of the different natural rubber types are determined by their particular regions of origin and processing or production methods.

An essential criterion in this regard is the production process of the natural rubber latex. This allows the natural rubber types to be divided into two classes, a first class, 1, and a second class, 2.

Class 1:

The rubber types of Class 1 are produced by the conventional process in which the coagulum slabs obtained from latex are processed further directly without comminution. The natural rubber of Class 1 is therefore not subjected to any mechanical stress in the production process and is usually dried at temperatures less than 70° C. As a result, it retains a relatively high molecular weight, which has clear advantages in the dynamic performance of the vulcanizates comprising this natural rubber. A significant disadvantage is, however, the commercial packaging form as "sheets", which make processibility significantly more difficult. Class 1 includes "Ribbed Smoked Sheets" (RSS), "Air Dried Sheets" (ADS), "UnSmoked Sheets" (USS) and "Pale Crepe".

Class 2:

The natural rubber of Class 2 is produced by the "crumb process", wherein the rubber is crushed to crumbs by means of rollers with addition of castor oil, or by mechanical comminution in granulators. The drying, which follows various washing processes, takes place at temperatures up to 130° C. The mechanical process gives rise to lower molecular weights, which have an adverse effect on the dynamic behavior of the corresponding vulcanizates. However, natural rubber of Class 2 is packaged in processing-friendly bales, which ensure significantly improved processibility. Class 2 includes "Standard That Rubber" (STR), "Standard Malaysian Rubber" (SMR) and "Standard Indonesian Rubber" (SIR).

Frequent attempts have been made to influence the properties of the natural rubber according to the criteria desired in each case. As representative examples of further publications on this subject, the following should be mentioned here: (D1) EP 0 950 485 A1; (D2) DE 199 13 047 B4; and, (D3) EP 1 120 429 A1 (U.S. Pat. No. 6,410,606).

EP 0 950 485 A1 discloses a process for producing natural rubber, and natural rubber thus obtained. Here, before or after a one-stage or multistage drying treatment of the natural rubber, a viscosity stabilizer is added. The usual problems with the drying conditions described in EP 0 950 485 A1 should be alleviated in order to obtain a natural rubber which has a high molecular weight and a low gel content.

The drying treatment results in an amount of gel in the natural rubber of 10% or less and a molecular weight retention of 85% or more.

DE 199 13 047 B4 describes a process for masticating natural rubber in a ramless internal mixer. The purpose of masticating natural rubber is to perform a cleavage of the long hydrocarbon chains in the rubber in order to lower the hardness of the rubber or to make it more easily deformable.

U.S. Pat. No. 6,410,606 discloses a process for producing natural rubber for pressure-sensitive adhesives. To this end, the molecular weight of a non-masticated natural rubber is reduced by using a "peptizer", while the non-masticated natural rubber is dissolved in an organic solvent.

SUMMARY OF THE INVENTION

It is therefore an object of the invention to provide a process for modifying natural rubber, which ensures improved processibility of the natural rubber obtained therefrom in combination with improved dynamic properties of the vulcanizates which comprise the natural rubber thus obtained.

This object is achieved by a process for modifying natural rubber, which is characterized by at least four process steps:
comminuting the natural rubber in a first process step;
blending and purifying the natural rubber in a second process step;
further comminuting the natural rubber in a third process step;
drying the natural rubber in a fourth process step.

It has been found that, surprisingly, only through these process steps, which have to proceed in the chronological sequence specified, can the natural rubber be modified to the effect that it can ensure better processibility with simultaneously good dynamic properties of the vulcanizates.

The natural rubber used is a latex rubber type which is produced from latex by acid coagulation and can be purchased commercially.

It is essential to the invention here that the natural rubber prior to the modification has been produced by a conventional process in which the coagulum slabs obtained from latex are processed further directly without comminution, and is present in the form of sheets. The natural rubber is preferably an unsmoked natural rubber of the USS type, though it is also possible to use a natural rubber of the ADS type or a combination of both types.

Prior to the modification and also after the modification, the natural rubber has a molecular weight, determined by gel permeation chromatography (GPC), of greater than or equal to 1 000 000 g/mol, preferably of greater than or equal to 1 200 000 g/mol and most preferably of greater than or equal to 1 500 000 g/mol.

The comminution of the natural rubber in the first process step takes place within a period of 1 to 10 min and is effected in a hammer mill and/or in a shredder. This comminutes the natural rubber to particles having a mean average particle size of greater than 1 cm to less than or equal to 15 cm, preferably greater than or equal to 1 cm to less than or equal to 10 cm. The first process step serves to prepare the natural rubber, especially in order to obtain a greater surface area for the second process step and in order to remove relatively large soil particles at this early stage. In addition, in the case of use of different natural rubber types, these are already, as it were, "pre-blended" at this early stage.

The blending and purification of the natural rubber in the second process step are effected in a stirred tank with the aid of a liquid, which is preferably water. The second process step takes place within a period of 1 to 15 min. It should be noted here that the second process step is a continuous process, in which blending and purifying each alternate at indeterminate intervals. The period of 1 to 15 min is therefore based on the total duration of the second process step, not on the individual duration of the blending or the individual duration of the purification.

The second process step preferably serves to minimize variations in the natural rubber types used, and additionally for further blending and purifying, i.e. for removing the soil still present.

The comminution of the natural rubber in the third process step takes place in a hammer mill and/or in a shredder and/or by means of a roller. The natural rubber is comminuted to particles having a mean average particle size of less than or equal to 10 mm, preferably less than or equal to 8 mm.

The third process step serves to further enlarge the surface area, which ensures another improvement in blending and further purification. In addition, this provides good air permeability for the subsequent drying step.

The drying of the natural rubber in the fourth process step takes place in a gaseous medium, which gaseous medium is preferably air. However, other gases, for example nitrogen, are also suitable. The drying takes place at temperatures between 90 and 120° C., preferably between 100 and 118° C. and more preferably at temperatures between 105 and 115° C.

The fourth process step serves to remove the residual moisture of the natural rubber types used by comparatively gentle drying at comparatively low temperature.

It is a further object of the invention to provide a modified natural rubber which features a comparatively high molecular weight and good processibility.

This object is achieved by virtue of the natural rubber being modified by at least four process steps.

The process steps comprise at least comminution of the natural rubber as a first process step, blending and purification of the natural rubber as a second process step, further comminution of the blended and purified natural rubber as a third process step and drying of the natural rubber as a fourth process step.

The natural rubber is a latex rubber type which is formed by acid coagulation of the latex and is commercially purchasable prior to modification.

It is essential to the invention that the natural rubber prior to the modification has been produced by a conventional process in which the coagulum slabs obtained from latex are processed further directly without comminution, and is present in the form of sheets.

Prior to the modification and after the modification, the modified natural rubber has a molecular weight, determined by gel permeation chromatography (GPC), of greater than or equal to 1 000 000 g/mol, preferably of greater than or equal to 1 200 000 g/mol and most preferably of greater than or equal to 1 500 000 g/mol.

In the course of the first process step, the modified natural rubber is comminuted within a period of 1 to 10 min, the comminution being effected in a hammer mill and/or in a shredder. In the course of the first process step, the modified natural rubber is comminuted here to particles having a mean average particle size of greater than 1 cm to less than or equal to 15 cm, preferably greater than or equal to 1 cm to less than or equal to 10 cm.

In the course of the second process step, the modified natural rubber is blended and purified in a stirred tank with the aid of a liquid, which is preferably water. In the course of the second process step, the modified natural rubber is blended and purified within a period of 1 to 15 min.

It should be noted here that the second process step is a continuous process in which blending and purification each alternate at indeterminate intervals. The period of 1 to 15 min therefore relates to the total duration of the second process step, not to the individual duration of the blending or the individual duration of the purification.

In the course of the third process step, the modified natural rubber is further comminuted. The further comminution in the course of the third process step takes place in a hammer mill and/or in a shredder and/or by means of a roller. In the course of the third process step, the modified natural rubber is comminuted to particles having a mean average particle size of less than or equal to 10 mm, preferably less than or equal to 8 mm.

In the course of the fourth process step, the modified natural rubber is dried in a gaseous medium, which gaseous medium is preferably air. However, other gases, for example nitrogen, are also suitable. In the course of the fourth process step, the modified natural rubber is dried at temperatures between 90 and 120° C., preferably between 100 and 118° C. and more preferably at temperatures between 105 and 115° C.

In addition, a rubber mixture which comprises a modified natural rubber according to the disclosure herein is provided.

It is a further object of the invention to use above-described modified natural rubber for producing tires, especially for producing the tread of a tire and/or a body mixture of a tire, and for producing drive belts and conveyor belts.

DESCRIPTION OF THE PREFERRED EMBODIMENTS OF THE INVENTION

The invention will now be illustrated in detail by comparative and inventive examples summarized in Tables 1 and 2. The rubber mixture designated "E" here comprises the inventive modified natural rubber, whereas the rubber mixtures designated "V" are comparative mixtures.

For all mixture examples present in the table, the amounts reported are parts by weight based on 100 parts by weight of total rubber (phr).

The mixtures were prepared under customary conditions in two stages in a laboratory tangential mixer. All mixtures were used to produce specimens by vulcanization, and these specimens were used to determine material properties typical of the rubber industry. For the above-described tests on specimens, the following test methods were employed:

Shore A hardness at room temperature to DIN 53 505
Rebound elasticity at 70° C. to DIN 53 512
Stress value at 300% elongation at room temperature to DIN 53 504
Relative degree of crosslinking of 5% (t5, scorch time) and 90% (t90, optimum vulcanization time) by means of a rotorless vulcameter (MDR=Moving Disc Rheometer) to DIN 53 529
Tensile strength at room temperature to DIN 53 504
Elongation at break at room temperature to DIN 53 504
Normalized Index 1: tensile strength multiplied by elongation at break, then normalization to V1

Normalized Index 2: tensile strength multiplied by elongation at break and multiplied by the 300% stress value, then normalized to V1

TABLE 1

| Constituents | Unit | V1 | V2 | V3 | V4 | E1 |
|---|---|---|---|---|---|---|
| RSS 3 STA-TG | phr | 100 | — | — | — | — |
| STR 20 BD | phr | — | 100 | — | — | — |
| SMR 10 CE | phr | — | — | 100 | — | — |
| SIR 20 SED | phr | — | — | — | 100 | — |
| Modified NR [a] | phr | — | — | — | — | 100 |
| Carbon black, N121 | phr | 48.5 | 48.5 | 48.5 | 48.5 | 48.5 |
| DTPD | phr | 1 | 1 | 1 | 1 | 1 |
| 6PPD | phr | 1.5 | 1.5 | 1.5 | 1.5 | 1.5 |
| Antiozonant wax | phr | 2.5 | 2.5 | 2.5 | 2.5 | 2.5 |
| Stearic acid | phr | 3 | 3 | 3 | 3 | 3 |
| Zinc oxide | phr | 2 | 2 | 2 | 2 | 2 |
| TBBS, sulphur | phr | 2.65 | 2.65 | 2.65 | 2.65 | 2.65 |

[a] TSS 8, modified in accordance with the invention

TABLE 2

| Properties | Unit | V1 | V2 | V3 | V4 | E1 |
|---|---|---|---|---|---|---|
| Scorch time t5 | min | 1.61 | 1.22 | 1.47 | 1.25 | 1.47 |
| Optimum vulcanization time t90 | min | 10.99 | >15 | 11.71 | 10.32 | >15 |
| Hardness at RT | Shore A | 65 | 66 | 64 | 65 | 65 |
| Rebound at RT | % | 59.9 | 57.2 | 59.7 | 58.3 | 59.8 |
| Tensile strength | MPa | 25.4 | 24.5 | 22 | 24.5 | 25.5 |
| Elongation at break | % | 472 | 468 | 429 | 474 | 478.5 |
| Normalized Index 1 | % | 100 | 96 | 79 | 97 | 102 |
| 300% stress value | MPa | 15.81 | 15.73 | 15.37 | 15.23 | 15.57 |
| Normalized Index 2 | % | 100 | 95 | 77 | 93 | 100 |
| Packaging form of the NR | | Sheets | Bales | Bales | Bales | Bales |
| Incorporability of fillers | | Difficult | Easy | Easy | Easy | Easy |
| Variations in the Mooney viscosities of the unmasticated NR | Points | ±20 | ±10 | ±10 | ±10 | ±5 |
| Molecular weight of the NR (determined by GPC) | g/mol | 1600000 | 900000 | 900000 | 900000 | 1600000 |

It is evident from Table 2 that the modified natural rubber (see E1), by virtue of the packaging form in the form of bales, has improved processability.

At the same time, it exhibits incorporability of fillers, for example silica and/or carbon black, equivalent to that of V2, V3 and V4, and hence better than that of V1. The viscosity variations, which result from the production, in the Mooney viscosities of the inventive natural rubber, as found in E1, are significantly less than those for the natural rubber of V1. In the industrial process, this leads to significant process reliability, and to improved "batch-to-batch" production. At the same time, the rubber mixture which comprises the inventive modified natural rubber, as a result of the comparatively high molecular weight of 1 600 000 g/mol, exhibits physical properties at a similar level to those of the mixture V1. The natural rubber of the mixture V1 has a comparable molecular weight, but is present in the form of sheets, which is less favorable for processing. The natural rubbers of mixtures V2, V3 and V4 are present in bale form, which is more favorable for processing, but have poorer physical properties owing to their significantly lower molecular weights.

It has been found that, surprisingly, the modified natural rubber, with regard to crosslinking characteristics and mixing properties, does not constitute a compromise between natural rubbers of Class 1 (see V1) and natural rubbers of Class 2 (see V2 to V4), but provides an improvement.

Relevant data which should be mentioned here are as follows:
- to improve prevulcanization, t5 should be as long as possible;
- with regard to proneness to reversion, t90 should be as long as possible;
- hardness at room temperature should be comparable;
- rebound at 70° C. should, as a rolling resistance indicator, be as high as possible;
- the ultimate mixing properties, represented by Normalized Index 1 and Normalized Index 2, should be significantly above 100%.

Consideration of Table 2 shows that the inventive modified natural rubber as was used in the rubber mixture E2 has the specifications mentioned.

It is understood that the foregoing description is that of the preferred embodiments of the invention and that various changes and modifications may be made thereto without departing from the spirit and scope of the invention as defined in the appended claims.

What is claimed is:

1. Process for modifying natural rubber, comprising at least the following process steps:
   comminuting the natural rubber in a first process step;
   blending and purifying the natural rubber in a second process step;
   further comminuting the natural rubber in a third process step; and
   drying the natural rubber in a fourth process step;
   wherein the natural rubber prior to the modification is a natural rubber which is produced by a process in which coagulum slabs are obtained from latex and are processed further directly without comminution;
   wherein the natural rubber is blended and purified in the second process step in a stirred tank with the aid of a liquid; and
   wherein the liquid is water.

2. Process according to claim 1, wherein the natural rubber is a latex rubber produced by acid coagulation of latex.

3. Process according to claim 1, wherein the first process step takes place within a period of 1 to 10 minutes.

4. Process according to claim 1, wherein the comminution of the natural rubber in the first process step takes place in a hammer mill and/or in a shredder.

5. Process according to claim 1, wherein the blending and purification of the natural rubber in the second process step take place within a period of 1 to 15 minutes.

6. Process according to claim 1, wherein the further comminution of the natural rubber in the third process step takes place in a hammer mill and/or in a shredder and/or by means of a roller.

7. Process according to claim 1, wherein the natural rubber is comminuted in the third process step to particles having a mean average particle size of less than or equal to 8 mm.

8. Process according to claim 1, wherein the natural rubber prior to the modification is a natural rubber which is produced by a process in which the coagulum slabs obtained from latex are processed further directly without comminution, and is present in the form of sheets.

9. Process according to claim 1, wherein the natural rubber is comminuted in the third process step to particles having a mean average particle size of less than or equal to 10 mm.

10. Process according to claim 1, wherein the natural rubber is comminuted in the first process step to particles having a mean average particle size of greater than 1 cm to less than or equal to 15 cm.

11. Process according to claim 10, wherein the natural rubber is comminuted in the first process step to particles having a mean average particle size of greater than 1 cm to less than or equal to 10 cm.

12. Process according to claim 1, wherein the drying of the natural rubber in the fourth process step takes place in a gaseous medium.

13. Process according to claim 12, wherein the gaseous medium is air.

14. Process according to claim 1, wherein the natural rubber prior to the modification has a molecular weight greater than or equal to 1 000 000 g/mol.

15. Process according to claim 14, wherein the natural rubber prior to the modification has a molecular weight greater than or equal to 1 200 000 g/mol.

16. Process according to claim 14, wherein the natural rubber prior to the modification has a molecular weight greater than or equal to 1 500 000 g/mol.

17. Process according to claim 1, wherein the drying of the natural rubber in the fourth process step takes place at a temperature between 90 and 120° C.

18. Process according to claim 17, wherein the drying of the natural rubber in the fourth process step takes place at a temperature between 100 and 118° C.

19. Process according to claim 17, wherein the drying of the natural rubber in the fourth process step takes place at a temperature between 105 and 115° C.

20. Process according to claim 1, wherein the natural rubber after the modification has a molecular weight greater than or equal to 1 000 000 g/mol.

21. Process according to claim 20, wherein the natural rubber after the modification has a molecular weight greater than or equal to 1 200 000 g/mol.

22. Process according to claim 20, wherein the natural rubber after the modification has a molecular weight greater than or equal to 1 500 000 g/mol.

23. Method for producing a tire, comprising preparing a modified natural rubber according to claim 1.

24. Method according to claim 23 for producing the tread of a tire.

25. Method according to claim 23 for producing a body mixture of a tire.

26. Method according to claim 25 for producing a body mixture of a tire or a tire component, wherein the tire component is selected from the group consisting of sidewall, inner liner, apex, belt, shoulder, belt profile, squeegee, carcass, bead reinforcer and bandage.

27. Method of producing a belt, comprising preparing a modified natural rubber according to claim 1.

28. Method of producing a conveyor belt, comprising preparing a modified natural rubber according to claim 27.

29. Method of producing a drive belt, comprising preparing a modified natural rubber according to claim 1, wherein the drive belt is selected from the group consisting of flat belt, V belt, V-ribbed belt and toothed belt.

30. Method according to claim 28 for producing a running side of the conveyor belt.

* * * * *